United States Patent [19]

Reddy

[11] E Re. 29,060

[45] Reissued Dec. 7, 1976

[54] CIRCUIT FOR PROVIDING ELECTRONIC WARM-UP ENRICHMENT FUEL COMPENSATION WHICH IS INDEPENDENT OF INTAKE MANIFOLD PRESSURE IN AN ELECTRONIC FUEL CONTROL SYSTEM

[75] Inventor: Junuthula N. Reddy, Oakland County, Mich.

[73] Assignee: The Bendix Corporation, Southfield, Mich.

[22] Filed: May 20, 1974

[21] Appl. No.: 471,511

Related U.S. Patent Documents

Reissue of:

[64] Patent No.: 3,771,502
Issued: Nov. 13, 1973
Appl. No.: 219,490
Filed: Jan. 20, 1970

U.S. Applications:

[63] Continuarion-in-part of Ser. No. 101,896, Dec. 28, 1970, Pat. No. 3,734,068, Ser. No. 219,275, Jan. 20, 1972, Ser. No. 226,486, Feb. 15, 1972, Ser. No. 226,498, Feb. 15, 1972, and Ser. No. 445,411, Feb. 25, 1974, which is a continuation of said Ser. No. 226,498.

[52] U.S. Cl. ..... 123/32 EA
[51] Int. Cl.[2] ..... F02B 3/00
[58] Field of Search ..... 123/32 EA

[56] References Cited

UNITED STATES PATENTS

| | | | |
|---|---|---|---|
| 3,464,396 | 9/1969 | Scholl | 123/32 EA |
| 3,566,846 | 3/1971 | Glockler | 123/32 EA |
| 3,646,915 | 3/1972 | Nagy | 123/32 EA |
| 3,646,917 | 3/1972 | Nagy | 123/32 EA |
| 3,646,918 | 3/1972 | Nagy | 123/32 EA |
| 3,664,311 | 5/1972 | Endo | 123/32 EA |
| 3,683,871 | 8/1972 | Barr | 123/32 EA |
| 3,710,763 | 1/1973 | Bassot | 123/32 EA |
| 3,742,919 | 7/1973 | Suda | 123/32 EA |
| 3,747,575 | 6/1973 | Eisele | 123/32 EA |
| 3,763,833 | 9/1973 | Rachel | 123/32 EA |
| 3,786,789 | 1/1974 | Barr | 123/32 EA |

*Primary Examiner*—Charles J. Myhre
*Assistant Examiner*—Ronald B. Cox
*Attorney, Agent, or Firm*—Gerald K. Flagg

[57] ABSTRACT

A circuit for recognizing and providing warm-up enrichment fuel compensation for an electronic fuel control system is described herein. The circuit is adapted to recognize and respond to an engine operating parameter indicative of engine operation at an engine temperature less than the normal operating temperature and to increase the duration of the fuel injection command pulse generated by the main electronic fuel control system. In those electronic fuel control systems which provide a fuel injection command pulse whenever a generated voltage wave shape is below a threshold value, the present invention contemplates altering the shape of the generated wave shape to delay its excursion through the threshold value.

10 Claims, 4 Drawing Figures

CIRCUIT FOR PROVIDING ELECTRONIC WARM-UP ENRICHMENT FUEL COMPENSATION WHICH IS INDEPENDENT OF INTAKE MANIFOLD PRESSURE IN AN ELECTRONIC FUEL CONTROL SYSTEM

Matter enclosed in heavy brackets[ ] appears in the original patent but forms no part of this reissue specification; matter printed in italics indicates the additions made by reissue.

BACKGROUND OF THE INVENTION

*CROSS-REFERENCE TO RELATED APPLICATIONS*

*This application is a continuation in part of my then copending and commonly assigned specifically referenced following U.S. Patent application:*

*1. Ser. No. 101,896 filed Dec. 28, 1970 and issued May 22, 1973 as Pat. No. 3,734,068,*

*2. Ser. No. 219,275 filed Jan. 20, 1972,*

*3. Ser. No. 226,486 filed Feb. 15, 1972,*

*4. Ser. No. 226,498 filed Feb. 15, 1972,*

*5. Ser. No. 445,411 filed Feb. 25, 1974 as a continuation of Ser. No. 226,498.*

1. Field of the Invention

The present invention is related to the field of electronic fuel control systems for internal combustion engines and particularly to that portion of the above-described field which is concerned with the provision of accurately metered quantities of fuel during transient operating conditions of an internal combustion engine. In particular, the present invention is concerned with that portion of the above-noted field which provides increased quantities of fuel for consumption by the engine when it is operating at a temperature under the normal operating temperature.

2. Description of the Prior Art

The prior art teaches that warm-up enrichment quantities of fuel may be provided through an electronic fuel control system by prolonging the unstable period of a monostable multivibrator in response to an engine temperature sensitive element. However, those systems which make use of the forenoted technique for providing warm-up enrichment are systems which also employ sequentially energized monostable multivibrators in which the unstable period of the second multivibrator in the sequence is a function of the unstable period of the first multivibrator in the sequence as well as the engine temperature. As a consequence, the enrichment quantities of fuel provided thereunder become a complex function of the instantaneous engine temperature as well as the engine parameter which controls the unstable time period of the first monostable multivibrator in the sequence. If the "enrichment factor" is defined as the fuel injection command pulse duration at cold (that is, below normal) temperatures divided by the fuel injection command pulse duration at normal engine operating temperature, the enrichment factor of prior art systems may be shown to be an undesirable decreasing function of intake manifold pressure. However, it is known that the desirable enrichment factor is a value which varies as a function of temperature and which is not a decreasing function of manifold pressure. It is therefore an object of the present invention to provide a warm-up enrichment mechanism for an electronic fuel control system which provides an enrichment factor for the quantities of fuel provided independent of any other engine operating parameter. Since it is normally the case to use engine intake manifold air pressure as the engine operating parameter controlling the first monostable multivibrator in the sequence, it is a still further object of the present invention to provide a warm-up enrichment mechanism which provides an enrichment factor for the quantities of fuel provided substantially independent of the instantaneous intake manifold pressure.

An additional problem with the prior art technique of using successively triggered monostable multivibrators is that, with the number of corrective functions to be inserted in the computational process, the maximum pulse duration obtainable under the most extreme engine operating conditions (i.e. low temperature engine starting) is substantially less than the time period required to provide fuel quantities adequate for engine operation under those conditions. As a consequence, the prior art teaches that it is necessary to provide, through parallel circuitry which may or may not include additional injector valve means, totally independent circuitry for commanding cold starting and the initial warm-up enrichment quantities of fuel which would operate to override the signal generated by the sequentially energized monostable multivibrator main computing circuitry. This solution greatly increased the cost and complexity of the electronic circuitry and also reduced the reliability thereof. It is therefore an object of the present invention to provide a means for generating cold starting and warm-up enrichment compensation which does not greatly increase either the cost or the complexity of the electronic circuitry and which does not represent a significant decrease in the reliability of such circuitry.

It has been proposed by my co-pending commonly assigned patent application identified by Ser. No. 101,896, Fuel Injection Control System, *issued May 22, 1973 as U.S. Pat. 3,734,068*, to generate an injection command pulse as a function of the time during which a generated wave form having a specific predetermined shape remains below a variable level, known as a threshold level. It has heretofore been assumed that the prior art cold starting and warm-up enrichment mechanisms and circuits would be readily adaptable for use with an electronic fuel control system according to my above identified co-pending application. However, many of the difficulties which arise from the use of separate and distinct cold starting and warm-up enrichment circuitry in the sequenced monostable multivibrator system also arise in the application of such cold starting and warm-up enrichment networks to electronic fuel control systems according to the above identified application. It is therefore an object of the present invention to provide a cold starting and warm-up enrichment network which is fully compatible with my above identified co-pending application and which does not require parallel circuitry to generate an overriding command pulse. It is a more particular object of the present invention to provide a warm-up enrichment network which controllably alters the shape of the generated wave shape so as to selectively control its time duration at values below the threshold level.

SUMMARY OF THE PRESENT INVENTION

The present invention provides a circuit which recognizes engine operation at a temperature less than the normal engine operating temperature and which thereafter controllably alters the generation of the timed pulse which is used to control the fuel delivery sequence. The invention further contemplates circuits which are capable of automatically recognizing the extent to which the engine operating temperature is below the normal operating temperature and thereafter lengthening the timed pulse in order to provide a correctly lengthened fuel delivery factor in response to the actual engine operating temperature.

In an electronic fuel control system making use of the generated waveshape/variable threshold level mechanism to generate fuel injection command signals, the present invention may be characterized by a circuit which is responsive to engine temperature and which is operative to controllably vary at least one aspect of the generated wave shape so as to controllably affect the time during which said generated wave shape remains below the established threshold level. In particular, the present invention contemplates the use of the electronic circuitry to selectively control the output of a current source which charges a timing capacitor to variably selectively control the voltage appearing across the timing capacitor as a function of engine operating temperature.

DETAILED DESCRIPTION OF THE DRAWING

Figure 1:
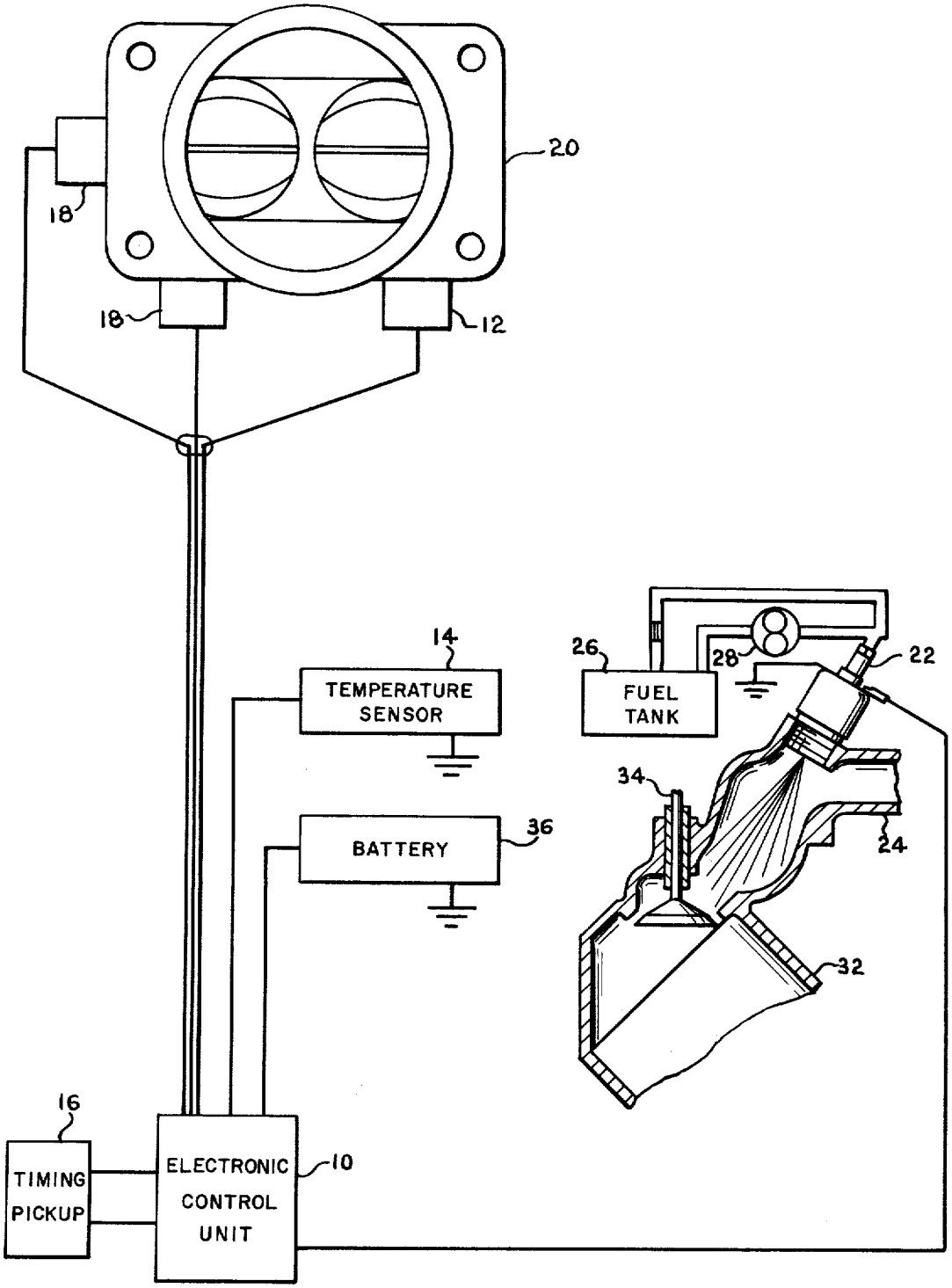
FIG. 1 shows, in diagramatic circuit form, an electronic fuel control system for an internal combustion engine with which the present invention is of utility.

Referring now to FIG. 1, an electronic fuel control system is shown in schematic form. The system is comprised of a main computing means or electronic control unit 10, a manifold pressure sensor 12, a temperature sensor 14, an input timing means 16 and various other sensors denoted as 18. The manifold pressure sensor 12 and the associated other sensors 18 are illustrated mounted on throttle body 20 but it will be understood that other mounting locations are possible. The output of the computing means 10 is coupled to an electromagnetic injector valve member 22 mounted in intake manifold 24 and arranged to provide fuel from tank 26 via pumping means 28 and suitable fuel conduits 30 for delivery to a combustion cylinder 32 of but one of several forms of an internal combustion engine otherwise not shown. While the injector valve member 22 is illustrated as delivering a spray of fuel toward an open intake valve 34, it will be understood that this representation is merely illustrative and that other delivery arrangements are known and utilized. Furthermore, it is well known in the art of electronic fuel control systems that computing means 10 may control an injector valve means comprised of one or more injector valve members 22 arranged to be actuated singly or in groups of varying numbers in a sequential fashion as well as simultaneously. The computing means 10 is shown as energized by battery 36 which could be a vehicle battery and/or battery charging system as well as a separate battery.

Figure 2:
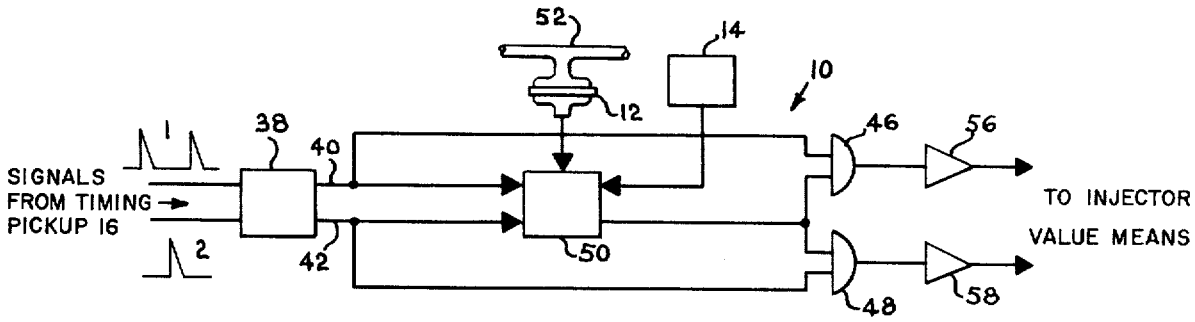
FIG. 2 shows, in a block diagram, one form of an electronic control unit for use in the system of FIG. 1.

The block diagram shown in FIG. 2 illustrates the computing means 10 in a nonparticulated manner as applied to a fuel system utilizing two-group injection. In FIG. 2, there is shown a switching device 38 capable of producing alternating output signals and receiving as input a signal or signals representative of engine crank angle as from sensor 16. Mechanically, sensor 16 could be a singlelobed cam, driven by the engine and alternately opening and closing a pair of contacts. Since this arrangement could generate spurious signals, as by contact bounce, the switching device 38 will be described and discussed as a flip-flop since the flip-flop is known to produce a substantially constant level of output at one output location and zero level at the other output location in response to a triggering signal which need only be a spike input as illustrated by traces 1 and 2 but may also be of longer duration and a flip-flop may be readily made insensitive to other types of signals. Signals received on the nontriggering input will, of course, have no effect on a flip-flop. Outputs 40 and 42 are connected to the input of unit 50 and are also connected to the inputs of a pair of AND gates with output 40 being connected to one input of AND gate 46 and output 42 being connected to one input of AND gate 48. Unit 50 is illustrated as receiving as its control input a signal from the pressure sensor 12 indicative of an engine operating condition and, therefore, of the engine fuel requirement. Sensor 12 is here shown coupled to a manifold lead or runner 52. The actual location of sensor 12 will depend upon the dynamic characteristics of the intake manifold and throttle body. Unit 50 also receives signals from temperature sensor 14 and it will be understood that use of these other sensory inputs, though not illustrated, is contemplated. However, for the sake of simplification the additional control inputs have not been shown. The output of the unit 50 is connected to a second input of each AND gate 46 and 48. The output of AND gate 46 is connected to amplifier 56 which, in turn, supplies controlling current to the first injector group. AND gate 48 is connected to amplifier 58 which supplies controlling current to the second injector group.

As will be readily apparent, the presence of an output signal from the flip-flop 38 will occur at one output location to the exclusion of the other. This signal will then appear at one input of only one AND gate of only one amplifier. This signal selectively designates an injector or injector group for imminent injection. For the sake of example, we shall assume that the output signal of the flip-flop 38 is at output location 40 so that the signal also appears at one input of AND gate 46. The signal from the output 40 of the flip-flop 38 also appears at the gate 44 where, assuming the flip-flop 38 has just changed state, a short duration signal is passed to the unit 50. Unit 50 is operative to produce an output during the passage of a predeterminable amount of time. This time is determined by the values of the sensory inputs applied to unit 50. During this initial period of time the output of the unit 50 is providing a full-strength output signal. This signal is applied to one input of each of the AND gates 46 and 48. Because of the intrinsic nature of AND gates, an output signal is produced only while an input signal is being applied to each and every input. This then dictates that AND gate 46 will produce an output to be amplified by amplifier 56 to open the first injector group since it is receiving an injector selection command directly from the flip-flop 38 and an injector control command from the unit 50. At the end of the time delay period unit 50 produces a zero level signal so that the injection control command output signal is removed from the input to the AND gate 46 and the output of the AND gate 46 goes to zero, thereby allowing the first injector group to close. During the period of time the first injector group is open, a metered amount of fuel under pressure is injected by the first injector group. Depending upon particular electronics selected, suitable amplifiers and/or inverters may be used to match obtainable signals with desired or necessary circuit responses.

Figure 3:
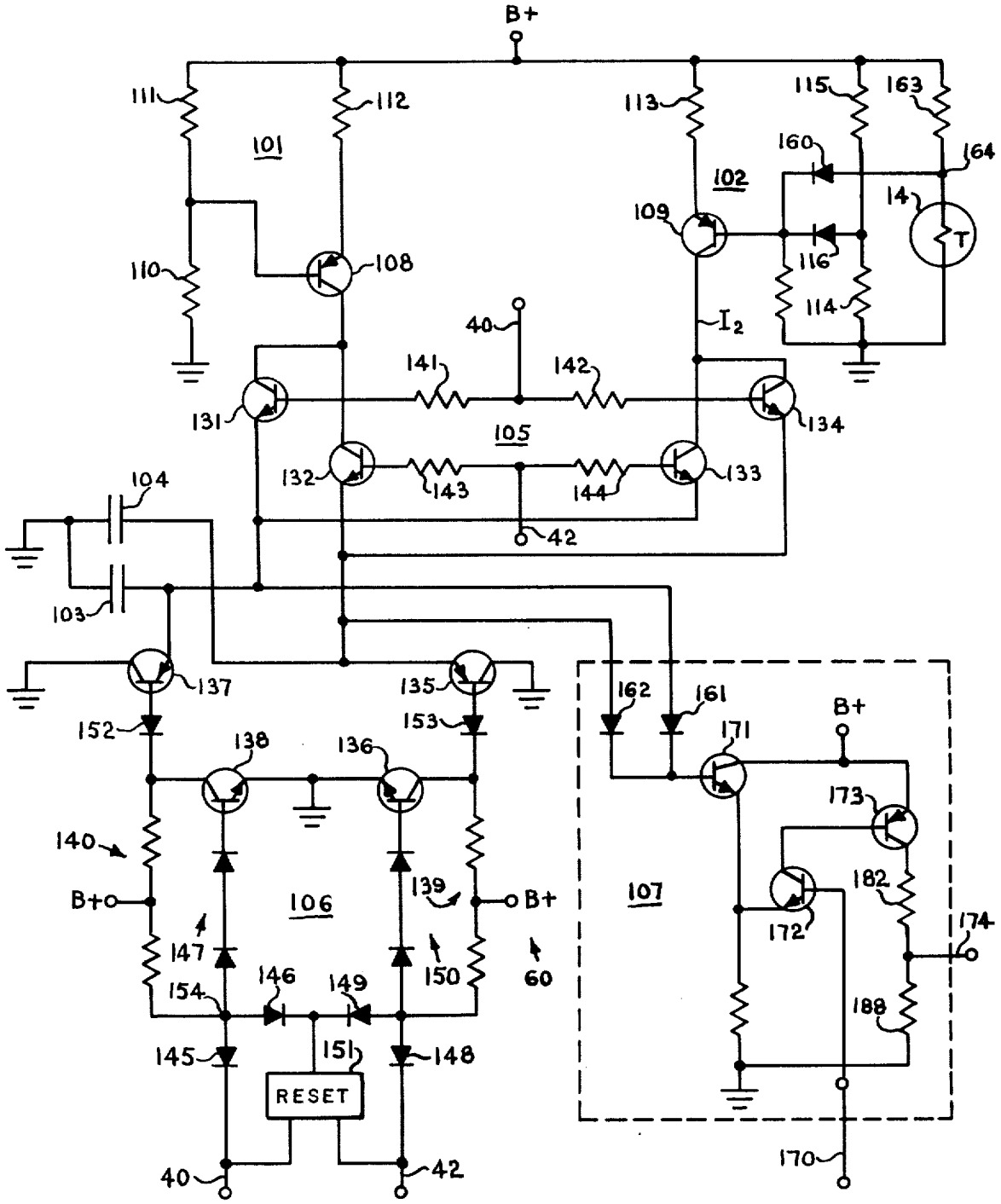
FIG. 3 shows an electronic circuit realization according to FIG. 2 and including the circuitry of the present invention.

Referring now to FIG. 3, an electronic circuit is illustrated to satisfy the functional requirements of block 50 in the block diagram of FIG. 2. A waveshape generating circuit means is comprised of a pair of current sources 101, 102 which are alternately applied to a pair of capacitors 103, 104 by a switching network 105 receiving the triggering signals 40, 42. The rate at which the capacitors 103, 104 are initially charged and are discharged is controlled by network 106 also receiving the triggering signals 40, 42. Threshold establishing circuit means 107 samples the highest voltages appearing across capacitors 103, 104 and compares this value with the level established by the pressure sensor means signal.

The current source 101 is comprised of transistor 108 whose base is connected to the junction of a pair of voltage dividing resistors 110, 111 and whose emitter is connected to resistor 112. The resistors 111 and 112 are connected to a source of potential identified as B+ and resistor 110 goes to ground. Current source 102 is similarly comprised of a transistor 109 whose base is coupled to the junction of voltage divider resistors 114, 115 through diode 116. The emitter of transistor 109 is connected to resistor 113 which is also connected to the B+ source. This arrangement is operative to establish a known level of current flow in the collectors of transistors 108, 109 respectively. The collector of transistor 108 is then connected in a parallel fashion to the collectors of a pair of transistors 131, 132. Similarly, the collector of transistor 109 is connected in parallel to the collectors of a pair of transistors 133, 134. The bases of transistors 131 and 134 are connected together through resistances 141, 142 while the bases of transistors 132, 133 are connected by way of resistances 143, 144. The junction of resistances 141, 142 is arranged to receive the trigger signals as at 40 while the junction of resistances 143, 144 is arranged to receive the trigger signals as at 42. The emitters of transistors 131 and 133 are connected to capacitor 103 while the emitters of transistors 132 and 134 are connected to capacitor 104. This circuit is then arranged to provide the current flow from current source 101 through transistor 131 to capacitor 103 and the current from source 102 through transistor 134 to capacitor 104 whenever a high voltage signal is present on lead 40 and a low voltage signal is present on lead 42. Whenever a low voltage signal is present on lead 40 and a high voltage signal is present on lead 42, the current from source 101 wll flow through transistor 132 to capacitor 104, while the current from source 102 flows through transistor 133 to capacitor 103.

Figure 4:
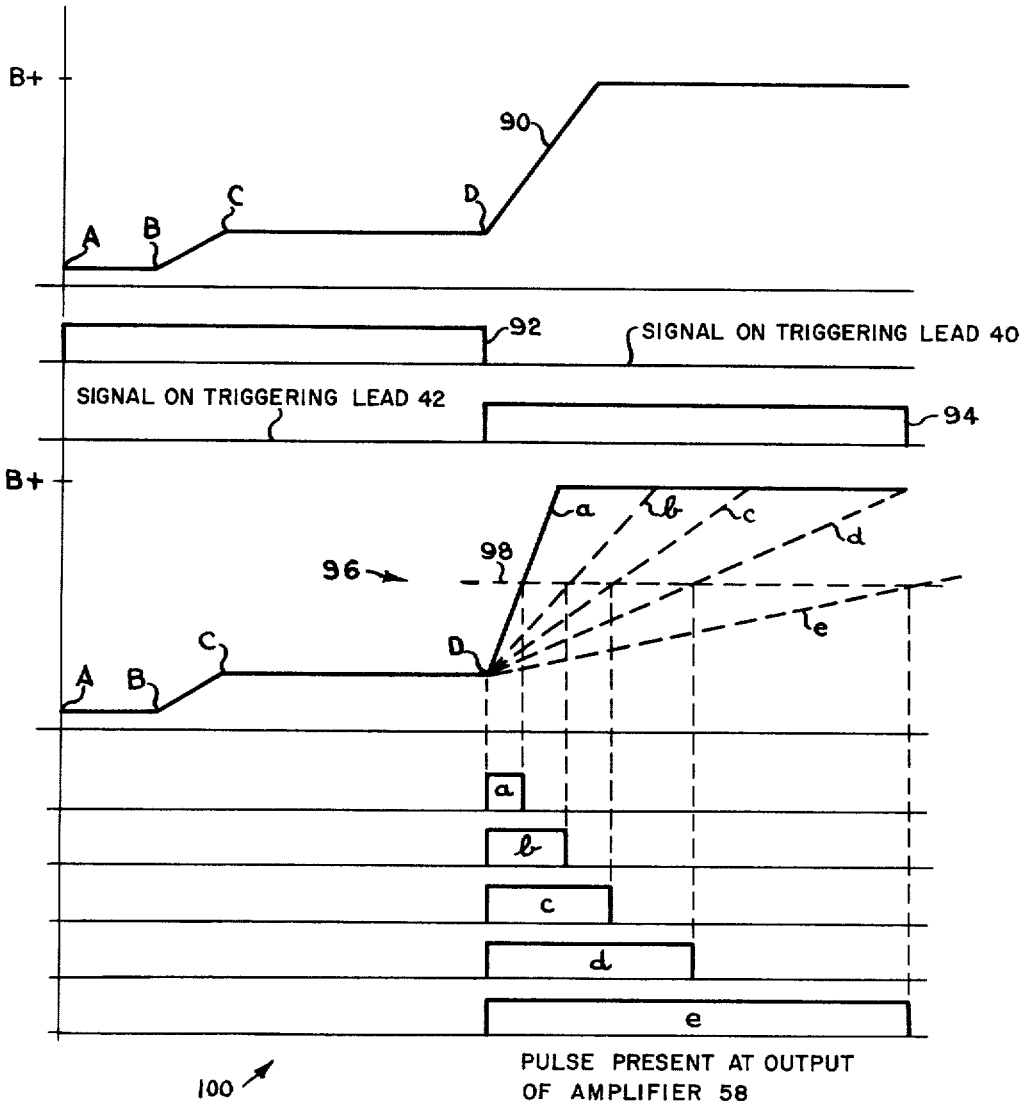
FIG. 4 shows a graph of voltage waveforms generated by the circuit of FIG. 3.

Network 106 is comprised of first, second, third, and fourth control transistors, numbers 135, 136, 137 and 138, respectively, a plurality of voltage level establishing resistor pairs 139, 140, and a plurality of voltage level establishing diode means 145 through 150. Reset means 151, and additional voltage level establishing diodes 152, 153, are also illustrated. Change of state of the flip-flop 38, as illustrated in FIG. 2, will reverse the high-low signal relationship appearing on triggering leads 40, 42, and the appearance of a high signal on one gate, for instance lead 40, will result in the generation of a reset pulse from reset means 151 which can be arranged to be a relatively high level signal. For example, reset means 151 may be a monostable multivibrator or other circuit arranged to generate a high level signal for a predetermined period of time upon the receipt of a high level triggering signal. The presence of these high level signals at circuit lead 40 and at the output of reset means 151 will cause junction 154 to be at a relatively high level and, through diode means 147, transistor 138 will be in conduction. This will, in turn, cause transistor 137 having its emitter connected to capacitor 103 to be in conduction so that the voltage then appearing across capacitor 103 will be dumped as a current flow to ground through the conducting transistors 137, 138. This voltage dump will continue until the voltage appearing across capacitor 103 reaches a low level determined by the number of pn junctions between capacitors 103 and ground. During this time interval, current flow from current source 101 through transistor 131 will be dumped to the extent that it would represent excess voltage across capacitor 103. Upon the termination of the reset pulse from reset means 151, the voltage at junction 154 will drop and, due to the plurality of diodes in diode means 147, will be insufficient to maintain transistor 138 in conduction. This will cause transistor 138 and in turn transistor 137 to switch off, thereby terminating the voltage dump of capacitor 103 and also permitting the current flow from current source 101 to increase the voltage level across capacitor 103. With reference to FIG. 4, the time interval of the reset pulse 151 would correspond to the interval A–B on graph 90, while the time interval B–C would represent the period during which capacitor 103 is charged by the current source 101. The level indicated by the C–D line of graph 90 represents a level when the charge across capacitor 103 is sufficiently high relative to the voltage level established by the voltage divider effects of resistors 110, 111, that the base-collector junction of transistor 108 is reverse biased, and the transistor begins to turn off. The operation of network 106 with regard to the receipt of a high level signal on triggering lead 42 is substantially the same as described hereinabove in view of the fact that the network 106 is comprised of two substantially identical halves, one of which has been described in detail herein. By suitably selecting the resistive values along with maintaining a relatively small capacitor value of capacitor 103, it can be arranged that the discharge of capacitor 103 down to level represented by the A–B portion of graph 90 in FIG. 4 can occur in a very brief time scale relative to the duration of a triggering pulse.

The threshold establishing circuit 107 receives a signal indicative of the manifold pressure at 170 and this signal is applied to the base of transistor 172. The base of transistor 171 receives a voltage signal from the capacitor 103, or 104 having the highest accumulated charge via diode 161 or diode 162. As the emitters of transistors 171, 172 are coupled together, one of these transistors will be in conduction depending upon which has a base residing at a higher voltage value. When the value appearing on circuit lead 66 exceeds the value appearing on circuit input 170, transistor 171 will go into conduction and transistor 172 will drop out of conduction. Termination of conduction of transistor 172 will consequently terminate conduction of transistor 173. While transistor 172 was conducting, transistor 173 was also conducting and a relatively high voltage signal was present at circuit location 174 due to the voltage divider action of resistors 182, 183. However, termination of conduction of transistor 173 will result in a substantially zero or ground level signal appearing at circuit location 174 due to the lack of current flow through the resistors 182, 183. This output signal may be applied to the OR gates 46, 48 in the FIG. 2 embodiment to constitute an injection command signal.

The present invention as illustrated in FIG. 3 is comprised of a circuit means for variably controlling the current $I_2$ generated by the current generating means 102. In the illustrated embodiment, this comprises means for variably modifying the bias voltage applied to the base of transistor 109. As illustrated, this is comprised of a further resistive voltage divider network including the temperature sensor 14 and resistance 163 arranged in parallel with the voltage divider network comprised of resistors 114, 115, and communicating with the base of transistor 109 through a further diode 160 whose cathode is connected to the cathode of diode 116 and whose anode is connected to the junction point 164 of the further voltage divider network. The temperature sensor is illustrated as a thermistor and other types of temperature sensor are known.

In the illustrated arrangement, transistor 109 is illustrated as a pnp transistor whose emitter is connected through resistance 113 to the B+ voltage source. The thermistor 14 is connected to ground and such devices are known to exhibit a higher resistance at lower temperatures. As so connected, decreasing temperature will cause the voltage appearing at junction 164 to increase so as to increase the voltage appearing at the base of transistor 109. Since the voltage at the emitter of transistor 109 will be only slightly more positive than the voltage present in the base of the transistor, the current flow through resistance 113 and consequently the output current of the current source 102 will vary inversely as the magnitude of the voltage present at the base of transistor 109. Thus, as this voltage increases due to a decrease in temperature the current output of transistor 109 will decrease. Conversely, as the temperature increases, the voltage present at the junction 164 will decrease and will have the effect of causing the current generated by current source 102 to increase. The previously described resistive voltage divider branch comprised of resistances 114 and 115 communicated to the base of transistor 109 through diode 116 will be operative to establish a minimum value below which the voltage at the base of transistor 109 will be prevented from going.

With reference now to FIG. 4, a series of graphs are illustrated graphing voltage as a function of time to illustrate the various voltage signals present within the circuit of FIG. 3. The uppermost curve indicated as graph 90 is illustrative of the voltage appearing across either of the capacitors 103, 104 during a complete current flow cycle. As can be seen, the voltage initial point A is relatively low (near the ground potential) and this level is maintained for a period of time. This time period is determined by reset means 151 in a manner which is more completely described in applicant's co-pending commonly assigned application [MOC 70/72, 72,] *219,275 filed Jan. 20, 1972 for a* Electronic FLE Switch for Fuel Injection. As current flow $I_1$ from current source 101 increases, the voltage will follow the portion of the graph designated B–C. Upon reaching the limiting value C, the voltage present across the capacitor will remain at a substantially level value until it reaches the time period denoted as D. Assuming graph 90 is the voltage appearing across capacitor 103, the time interval A–D represents the time during which a triggering pulse is present on triggering lead 40, illustrated as the voltage pulse identified as 92. Upon termination of the pulse 92, a similar pulse denoted as pulse 94 is applied to the triggering lead 42. The application of triggering pulse 94 on triggering lead 42 will cause a similar voltage waveshape to appear across capacitor 104. In the meantime, the voltage present on capacitor 103 will be increasing from a value established at time D to a limiting value under the influence of application of current $I_2$ from current source 102. At normal operating temperatures, the slope of this increase will be substantially as illustrated in graph 90 and the injection time will be determined by the total elapsed time required for the voltage present on capacitor 103 to go from the value existing on that capacitor at the time denoted as D until the voltage on capacitor 103 reaches a threshold value which may be determined for example by the pressure sensor 12 through the circuitry denoted as 107 in FIG. 3.

With reference now to the voltage waveshape 96 in FIG. 4, the effect of the present invention will be illustrated. The voltage waveshape 96 is essentially the same as the voltage waveshape 90 during the time interval A to D. However, from the time D until the limiting value is reached five various voltage slopes are illustrated and are denoted as a through e. These correspond to some of the slopes obtainable through the use of the present invention for varying operating temperatures. Slope e may represent the slope obtained by the lowest operating temperature while the slope a represents the slope obtained at a normal operating temperature, as defined by the voltage divider resistances 114, 115, and the slopes b, c, and d represent various intermediate levels.

A representative threshold value has been applied to the voltage waveshape 96 and has been numbered 98. Referring now to the voltage waveshape identified as 100, the output of voltage present at amplifier 58 in response to the voltage waveforms 94 & 96 with threshold level 98 is indicated. The first portion of the voltage waveform 100 is identified as a and corresponds to the pulse which would be generated by the portion of the waveform also identified as a in response to threshold 98. For lower temperature conditions when the present invention would so control current source 102 that the voltage waveform appearing across capacitor 103 is as indicated by waveform b, the pulse duration also identified as b would be present. For decreasing temperatures which would produce the waveshapes c and d the pulse durations identified as c and d would also be generated. For the most extreme condition of engine temperature the second portion of the waveshape 96 would most closely resemble the waveshape identified as e and in this instance, the total output pulse duration present at the output of amplifier 58 would be as represented by the total pulse e.

It can now be seen that the present invention accomplishes its stated objectives in a desirably expeditious form by controlling the magnitude of a current used to controllably charge a timing capacitor in a system which utilizes the time required for that current to charge the timing capacitor to a preselected level as a temperature compensation device. While the specific implementation of my invention has been controlled by the nature of the associated electronics, it will be understood that other implementations are possible. For example, an additional current source or a current sink could readily be controlled to achieve the results of my specific embodiment and such variations are intended to be encompassed by the claims which follow.

I claim:

1. An internal combustion engine fuel control system comprising:

current source means;

electrical storage means;

first control means responsive to one engine operating parameter for providing a threshold signal;

switching control means responsive to another engine operating parameter for switchingly connecting said current source means to said storage means to provide a timed series of *sequentially varied initial levels and* variable level injection command signals; *each said command signal commencing at said initial level* transistor means for controlling current flow from said current source means to said storage means;

voltage level establishing means for supplying a normal operating bias voltage to said transistor control means;

means responsive to engine temperature for providing a secondary bias voltage to the transistor means in response to engine temperature below a preselected level to reduce the rate at which current is supplied from said source means to said storage means and thereby increase the durations of said command signals; and fuel delivery means commanded only by said series of command signals for supplying fuel to the engine whenever a command signal has a predetermined relationship with respect to the value of said threshold signal.

*2. An internal combustion engine fuel control system comprising:*

*current source means;*

*electrical storage means;*

*first control means responsive to an engine air consumption dependent parameter engine operating parameter for providing a threshold signal;*

*switching control means responsive to an engine speed for switchingly connecting said current source means to said storage means to provide a timed series of sequentially variable initial levels and variable level injection command signals, each said variable level injection command signal beginning at a said initial level;*

*transistor means for controlling current flow from said current source means to said storage means, said transistor means responsive to engine temperature to control the rate at which current is supplied from said source means to said storage means and thereby vary the durations of said command signals; and*

*fuel delivery means commanded only by said series of command signals for supplying fuel to the engine whenever a command signal has a predetermined relationship with respect to the value of said threshold signal.*

*3. The circuit of claim 1 wherein said one engine operating parameter is one of an engine speed dependent parameter and an engine air comsumption dependent parameter.*

*4. In an internal combustion engine fuel injection control system of the type providing a ramp voltage for each engine cycle and increasing at a controllable rate from an initial value through a threshold value and for generating a fuel injection control signal having a duration determined by a first elapsed time defined between said initial value and said threshold value, a second elapsed time being defined between the time said ramp voltage crosses said threshold value and the time said ramp voltage is initiated, improved circuit means for controlling said controllable rate, said initial value, and said threshold value comprising:*

*a. first, second and third sensor means for providing output signals responsive to the magnitude of said respective first, second and third engine operating parameters, at least one of which varies with temperature;*

*b. ramp rate control means coupled to one of said sensor means for controlling the ramp of said ramp voltage in accordance with one of said engine operating parameters;*

*c. initial value control means coupled to a second of said sensor means for controlling said initial value in accordance with a second of said engine operating parameters;*

*d. threshold value control means coupled to a third of said sensor means for controlling said threshold value in accordance with a third of said engine operating parameters; and*

*e. cycle by cycle computation means responsive to one of said sensors means for recomputing one of said initial value, threshold value, and controllable rates during said second elapsed time of such engine cycle.*

*5. The circuit of claim 4 wherein said first engine operating parameter is one of an engine speed dependent parameter and an engine air consumption dependent parameter.*

*6. In an internal combustion engine fuel injection control system, a circuit for generating a fuel injection command signal comprising:*

*a. means for generating a ramp voltage commencing at an initial value determined in accordance with a first engine operating parameter, varying from said initial value at a predetermined rate controlled in accordance with a second engine operating parameter, and crossing a threshold value determined in accordance with a third engine operating parameter;*

*b. means for recomputing one of said initial value, threshold value, and controllable rate intermediate the time said ramp crosses said threshold value and time said ramp commences from said initial value; and*

*c. means for generating a fuel injection command in accordance with the time elapsed between said initial value and said threshold value.*

*7. The fuel injection command circuit of claim 6 wherein one of said engine operating parameters is determined in accordance with engine speed, one of said initial value and said threshold value is determined in accordance with said one engine operating parameter, and trigger means provide trigger pulses switchable between first and second states at a frequency determined by engine speed.*

*8. The fuel injection command circuit of claim 6 further comprising capacitor means; current source means selectively switchable to charge said capacitor means; first switching means coupled to said capacitor means and to said current source means operative to allow said current source means to charge said*

*capacitor means at said controllable rate from the time said ramp voltage is initiated until after said ramp voltage crosses said threshold value; and second switching means coupled to said capacitor means operative between the time said ramp voltage is initiated and the time said ramp voltage crosses said threshold value to reset said ramp voltage to a predetermined level and thereafter selectively permit said current source to charge said capacitor means so as to establish said initial value in accordance with the time elapsed from the time said ramp voltage is reset to the time said ramp voltage is initiated.*

*9. The fuel injection command circuit of claim 8 wherein said second switching means comprises reset pulse generating means and first and second transistors of opposite types each having three electrodes, the first electrode of said first transistor coupled to said capacitor means and the second electrode of said first transistor coupled to a source of reference potential, said first electrode of said second transistor coupled to said third electrode of said first transistor, said second electrode of said second transistor coupled to said source of reference potential, and said third electrode of said second transistor coupled to said reset pulse generating means said reset pulse generating means being operative on a switch of said trigger signals to couple said first and second transistors to provide a predetermined voltage drop between said first electrode of said first transistor and said source of reference potential, said predetermined voltage drop corresponding substantially with said predetermined level.*

*10. In an internal combustion engine fuel injection control system of the tupe having a control circuit to electrically control the open time of at least one fuel injection valve in response to the rotation of an engine crankshaft and the magnitudes of temperature and at least two other different engine operating parameters, an improved control circuit comprising:*

*a. capacitor means for generating a first pulse train which produces at least one pulse for each cycle of the engine crankshaft, said first pulse train having successive pulses defining an interval therebetween, each said pulse starting at an initial point and then increasing at a controllable rate therefrom;*

*b. means for varying the magnitude of said initial point in accordance with a first of said two other engine operating parameters;*

*c. means for varying said controllable rate in accordance with temperature;*

*d. means for generating a second pulse train having pulse durations which begin when a pulse from said first pulse train is initiated and ends when a pulse from said first pulse train reaches a threshold value established in accordance with the second of said two other engine operating parameters;*

*e. means responsive to the magnitude of one of said two other engine operating parameters and said interval between said first pulse train pulses for establishing the value of one of said initial point and threshold value in accordance with the magnitude of the corresponding one of said two other engine operating parameters during said interval;*

*f. means for applying said pulses of said second pulse train to said fuel injector valve to open said valve for the duration of a pulse of said second pulse train.*

* * * * *

UNITED STATES PATENT OFFICE

CERTIFICATE OF CORRECTION

Patent No. RE 29,060 Dated December 7, 1976

Inventor(s) Junuthula N. Reddy

It is certified that error appears in the above-identified patent and that said Letters Patent are hereby corrected as shown below:

Column 6, line 23, change "capacitors" to --capacitor--.

Column 10, line 33, delete "such" and insert --each--.

Signed and Sealed this

Twenty-second Day of March 1977

[SEAL]

*Attest:*

RUTH C. MASON
*Attesting Officer*

C. MARSHALL DANN
*Commissioner of Patents and Trademarks*